United States Patent [19]
Maruo et al.

[11] Patent Number: 5,598,501
[45] Date of Patent: Jan. 28, 1997

[54] POLYIMIDE OPTICAL WAVEGUIDE AND METHOD OF MANUFACTURING THE SAME

[75] Inventors: Yasuko Maruo, Kodaira; Shigekuni Sasaki, Iruma; Toshiaki Tamamura, Atsugi; Tohru Matsuura, Yokohama; Shinji Ando, Tokyo; Shinsuke Matsui, Kodaira; Fumio Yamamoto, Hoya, all of Japan

[73] Assignee: Nippon Telegraph and Telephone Corporation, Tokyo, Japan

[21] Appl. No.: 423,695

[22] Filed: Apr. 18, 1995

Related U.S. Application Data

[62] Division of Ser. No. 213,918, Mar. 15, 1994, abandoned.

[30] Foreign Application Priority Data

Mar. 18, 1993 [JP] Japan .................................. 5-082516
Jun. 28, 1993 [JP] Japan .................................. 5-178574

[51] Int. Cl.⁶ .................................................... G02B 6/00
[52] U.S. Cl. ............................ 385/143; 385/131; 385/132
[58] Field of Search ................................ 385/141–145, 385/123, 129–132

[56] References Cited

U.S. PATENT DOCUMENTS

| | | | |
|---|---|---|---|
| 4,808,285 | 2/1989 | Chen et al. | 216/24 |
| 5,108,201 | 4/1992 | Matsuura et al. | 385/123 |
| 5,113,471 | 5/1992 | Inaishi et al. | 385/126 |
| 5,202,938 | 4/1993 | Man et al. | 385/11 |
| 5,317,082 | 5/1994 | Beuhler et al. | 385/123 |

FOREIGN PATENT DOCUMENTS

| | | |
|---|---|---|
| 0525606A1 | 2/1993 | European Pat. Off. . |
| 3-72528 | 3/1991 | Japan . |
| 4-9087 | 1/1992 | Japan . |
| 4-8734 | 1/1992 | Japan . |
| 4-226549 | 8/1992 | Japan . |
| 4-235505 | 8/1992 | Japan . |
| 4-235506 | 8/1992 | Japan . |
| 2191603 | 12/1987 | United Kingdom . |

OTHER PUBLICATIONS

T. Matsuura et al, Macromolecules, vol. 27, No. 22, pp. 6665–6670 Polyimides Derived From 2,2'-Bis (Trifluoromethyl)-4,4'-Diaminobiphenyl. 4. Optical Properties of Fluorinated Polyimides for Optoelectronic Components, 1994. (No month).

Applied Optics, vol. 29, No. 27, Sep. 10, 1990, New York, USA, pp. 3880–3882, M. J. Rooks et al, "Polyimide Optical Waveguides Fabricated With Electron Beam Lithography".

Electronics Letters, vol. 29, No. 3, Feb. 4, 1993, Stevenage, G.B., pp. 269–271, T. Matsuura et al, "Low Loss, Heat-Resistant Optical Waveguides Using New Fluorinated Polyimides".

Electronics Letters, vol. 27, No. 5, Feb. 28, 1991, Stevenage, G.B., pp. 448–450, J. Bell et al, "Channel Optical Waveguides Directly Written In Glass With An Electron Beam".

Polymer Preprints, Japan; vol. 42, No. 3, 1993 The Society Of Polymer Science, Japan; p. 1140 (No month).

Organic Thin Films For Photonic Applications; 1993 Technical Digents, Series vol. 17 No month.

*Primary Examiner*—John Ngo
*Attorney, Agent, or Firm*—Frishauf, Holtz, Goodman, Langer & Chick

[57] ABSTRACT

A polyimide optical waveguide comprising a core made of polyimide whose refractive index is controlled to a predetermined value by electron beam irradiation, and a cladding set in contact with the core and having a refractive index lower than that of the core.

14 Claims, 8 Drawing Sheets

A

B

C

D

E

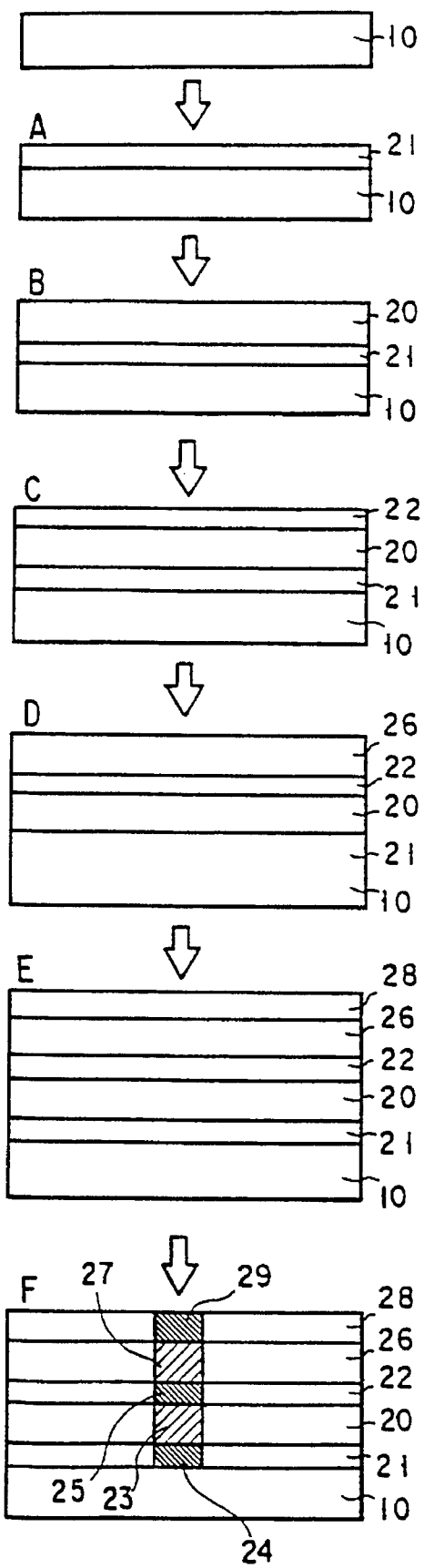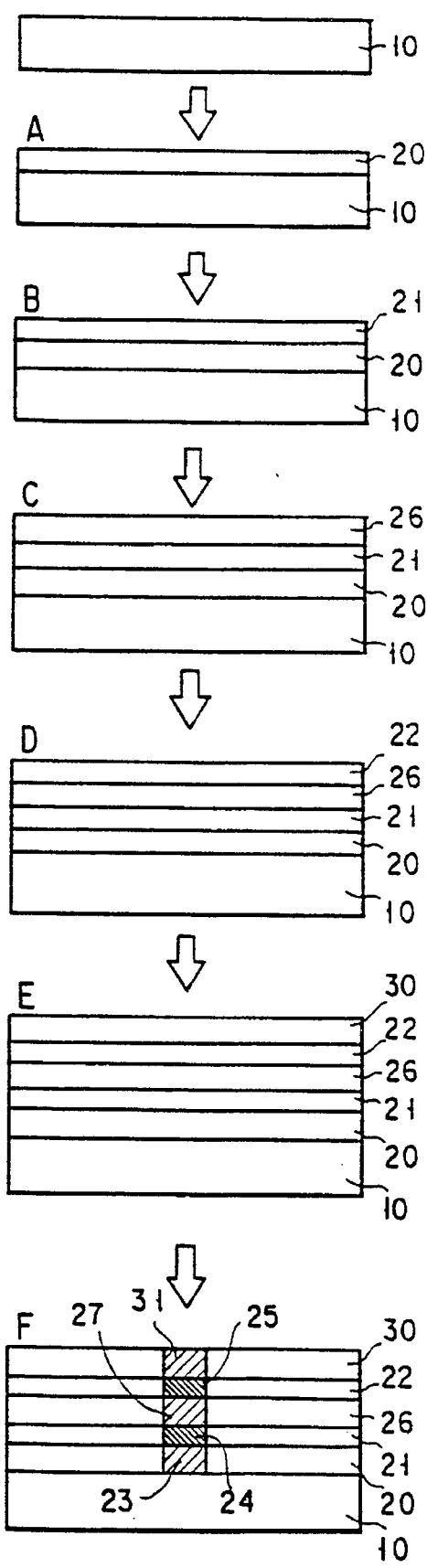
F I G. 21   F I G. 23

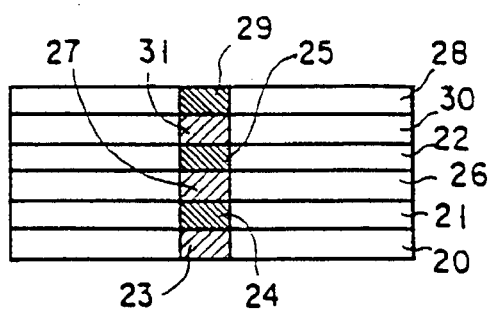
F I G. 26
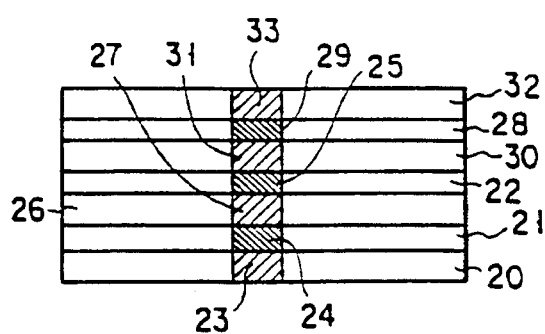
F I G. 28
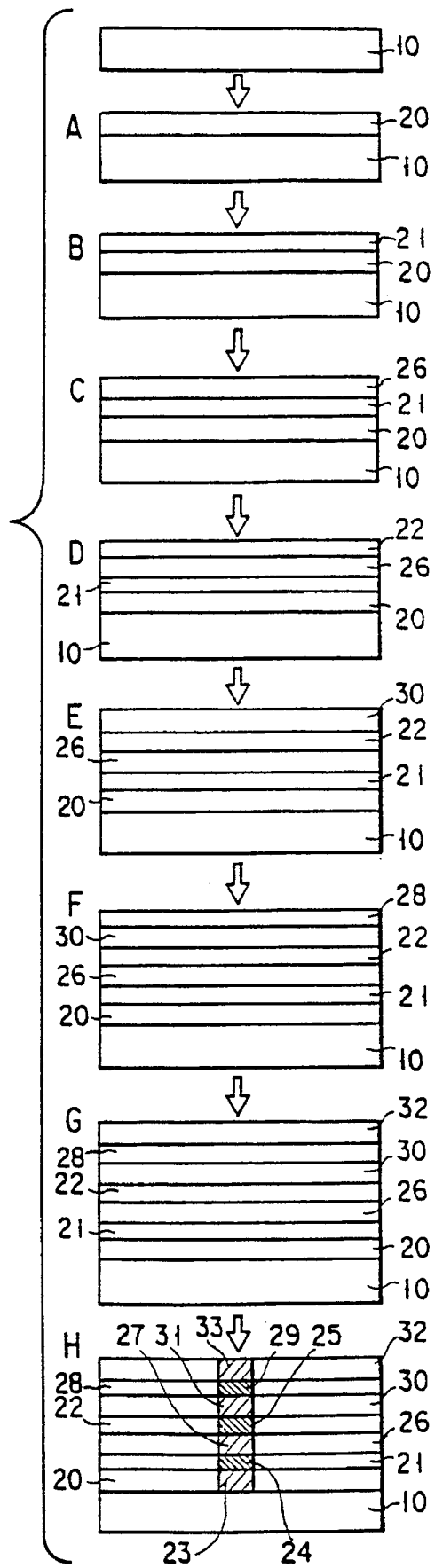
F I G. 29

POLYIMIDE OPTICAL WAVEGUIDE AND METHOD OF MANUFACTURING THE SAME

This is a division of application Ser. No. 08/213,918 filed Mar. 15, 1994, abandoned in favor of Ser. No. 08/425,343, filed Apr. 19, 1995.

BACKGROUND OF THE INVENTION

1. Field of the Invention

The present invention relates to a polyimide optical waveguide, and more particularly to a polyimide optical waveguide in which the polyimide, the refractive index of which is controlled by an electron beam irradiation to a desired value, is used as a core, and also to a facile fabrication of the polyimide optical waveguide.

2. Description of the Related Art

As an optical communication system is put to practical, thanks to the development of a low loss optical fiber, it is desired that various kinds of devices for the optical communication be developed. Further, there are demands for an optical wiring technique, more particularly an optical waveguide technique by which the optical devices are packaged in high density.

Generally, some conditions are required of an optical waveguide, for example, low optical losses, facile fabrication, controllable core-cladding refractive index ratio, and a high heat resistance.

As material of the optical waveguide having low optical losses, a silica-based material can be cited. As already proved in optical fiber, silica which has a good optical transmittance achieves an optical loss of 0.1 dB/cm or less at wavelength of 1.3 μm, if used in an optical waveguide. Manufacture of quartz glass optical waveguides, however, presents a number of problems including a manufacturing processes lengthy in terms of time, the high temperatures needed during fabrication, and the difficulty of making optical waveguides with a large area.

To solve these problems, attempts have been made to produce optical waveguides using plastics such as polymethylmethacrylate (PMMA), which can be manufactured at low temperatures and low cost. Conventional plastic optical waveguides, however, have low resistance to high temperature. Thus, there is a demand for plastic optical waveguide having an excellent heat resistance.

Among the various organic polymers currently available, polyimides provide very high resistance to heat. Hence, these materials have been widely employed in the field of electronics, to form an insulating film between layers in the multilayer wiring or to form a flexible print board. However, there has been no example in which polyimide is applied for an optical device such as an optical waveguide.

In view of this, the inventors of the present invention have studied and developed a polyimide optical material which is applicable for an optical waveguide. When polyimide is used in optical communication applications as the optical material, there are two important points. First, its transparency in the visible and near infrared regions is excellent. Second, its refractive index can be controlled freely. The inventors disclose a fluorinated polyimide with excellent transparency in the visible and near infrared regions, in Jpn. Pat. Appln. KOKAI Publication No. 3-72528. Further, in Jpn. Pat. Appln. KOKAI Publication No. 4-8734, it is disclosed that the core-cladding refractive index ratio, as is needed for, for example, forming an optical waveguide, is quite controllable by copolymerizing such fluorinated polyimide. Furthermore, optical waveguides using fluorinated polyimide are disclosed in Jpn. Pat. Appln. KOKAI Publications Nos. 4-9807, 4-235505 and 4-235506. The control of the refractive index difference between the core layer for passing the light and the cladding layer for shutting the light is achieved by adjusting the fluorine content in the polyimide. Namely, two kinds of fluorinated polyimide having the different refractive indices for the core layer and for the cladding layer are used respectively. Therefore, there may be some problems with a kind of an optical waveguide; that is, the core layer and the cladding layer may be different in thermal properties or the birefringence.

In the conventional method of manufacturing a polyimide optical waveguide, a reactive ion etching (RIE) method, which is used in a semiconductor manufacturing process, is generally employed. The RIE method is disadvantageous in that it comprises many steps. Therefore, a facile fabrication of polyimide optical waveguides, which comprises a smaller number of steps and by which the above-mentioned method may be replaced, has been desired.

The inventors of the present invention have studied to solve the above-mentioned problems and have found it possible to change the refractive index of polyimide films by irradiating the films with an electron beam, as they disclose in Japanese Patent Application No. 4-226549.

SUMMARY OF THE INVENTION

An object of the present invention is to provide an optical waveguide and an improved method of manufacturing a polyimide optical waveguide in which the problems caused by the difference in thermal properties and birefringence between the core and the cladding can be solved, with simple steps.

In order to achieve the above-mentioned object, the polyimide optical waveguide according to the present invention comprises a core made of polyimide whose refractive index is controlled to a predetermined value by electron beam irradiation; and a cladding in contact with the core and having a refractive index lower than that of the core.

According to another aspect of the present invention, there is provided a polyimide optical waveguide comprising: at least one core made of polyimide whose refractive index is controlled to a predetermined value by electron beam irradiation and at least one cladding having a refractive index controlled by electron beam irradiation and being lower than that of the at least one core, wherein the at least one core and the at least one cladding are alternately laid one on another.

Having the above-mentioned structure, both the core and the cladding of the polyimide optical waveguides of the present invention can have almost the same thermal properties and birefringence.

According to still another of the present invention, there is provided a method of manufacturing a polyimide optical waveguide, comprising the steps of: forming a first polyimide layer on a substrate; forming a core layer having a predetermined refractive index by irradiating the polyimide layer with an electron beam; forming a second polyimide layer on the core layer and removing the substrate, thereby forming a polyimide film having a two-layer structure; and bonding the second polyimide layer as a lower cladding to another substrate, thereby forming a core having a predetermined shape in the core layer.

According to a further aspect of the present invention, there is provided a method of manufacturing a polyimide optical waveguide, comprising steps of: forming a first polyimide layer on a substrate forming a second polyimide layer on the first polyimide layer, the second polyimide layer having a refractive index higher than that of the first polyimide layer; forming a third polyimide layer on the second polyimide layer, the third polyimide layer having a refractive index lower than that of the second polyimide layer; and performing electron beam lithography on the three polyimide layers, thereby forming a core in the second polyimide layer, the core having a predetermined refractive index and a predetermined shape.

According to an aspect of the present invention, there is provided a method of manufacturing a polyimide optical waveguide, comprising the steps of: forming a plurality of polyimide layers, one on another and irradiating the plurality of polyimide layers with an electron beam, thereby forming cores and claddings alternately laid one on another, each cladding having a refractive index lower than those of the cores.

According to another aspect of the present invention, there is provided a method of manufacturing a polyimide optical waveguide, comprising the steps of: forming a first polyimide layer on a substrate; and forming a core having a predetermined refractive index and a predetermined size in an upper surface of the polyimide layer and to a predetermined depth, by irradiating the polyimide layer with an electron beam in the condition that the election beam is prevented from reaching a lower surface of the polyimide layer.

Further, with the methods of manufacturing the polyimide optical waveguide, according to the present invention, it is possible to form the core easily, in steps which are easy to perform.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general-description given above and the detailed description of the preferred embodiment given below, serve to explain the principles of the invention.

FIG. 21 is a view showing the steps of manufacturing the polyimide optical waveguide shown in FIG. 20;

FIG. 23 is a view showing the steps of manufacturing the polyimide optical waveguide shown in FIG. 22;

FIG. 26 is a sectional view of the subject portion of showing the polyimide optical waveguide of a six-layer structure;

FIG. 28 is a sectional view of the subject portion of showing an embodiment of a polyimide optical waveguide of a seven-layer structure; and FIG. 29 is a view showing the steps of manufacturing the polyimide optical waveguide shown in FIG. 28.

DETAILED DESCRIPTION OF THE PREFERRED EMBODIMENTS

Hereinafter, one embodiment of the present invention will be explained based on the drawings.

Figure 1:
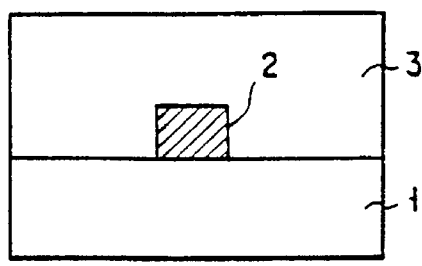
FIG. 1 is a sectional view showing one embodiment of an embedded channel waveguide in which a core having rectangular section is embedded in one layer of the cladding of a two-layer structure.

FIG. 1 shows a sectional view of an embedded channel waveguide of a two-layer structure, wherein a core 2 is formed on one cladding 1 and another cladding 3 is laminated on the cladding 1 so as to embed the core 2. The core 2 used herein is made of polyimide whose refractive index is controlled by irradiating with an electron beam. The polyimide-includes polyimides formed of a tetracarboxylic acid or a derivative thereof and a diamine, polyimide copolymers, and polyimide mixtures, whose refractive index can be controlled.

A derivative of a tetracarbxylic acid includes an acid anhydride, an acid chloride, or an ester. Examples of a tetracarboxylic acid are (trifluoromethyl)pyromellitic acid, di(trifluoromethyl)pyromellitic acid, di(heptafluoropropyl)pyromellitic acid, pentafluoroethylpyromellitic acid, bis{3,5-di(trifluoromethyl)phenoxy}pyromellitic acid, 2,3,3',4'-biphenyltetracarboxylic acid, 3,3',4,4'-tetracarboxydiphenylether, 2,3',3,4'-tetracaroxydiphenylether, 3,3',4,4'-benzophenonetetracaroxylic acid, 2,3,6,7-tetracarboxynaphthalene, 1,4,5,7-tetracarboxynaphthalene, 1,4,5,6-tetracarboxynaphthalene, 3,3',4,4'-tetracarboxydiphenylmethane, 3,3',4,4'-tetracarboxydiphenylsulfone, 2,2-bis(3,4-dicarboxyphenyl)propane, 2,2-bis(3,4-dicarboxyphenyl) hexafluoropropane, 5,5'-bis(trifluoromethyl)-3,3',4,4'-teracarboxybiphenyl, 2,2',5,5'-tetrakis(trifluoromethyl)-3,3',4,4'-tetracaroxybiphenyl, 5,5'-bis(trifluoromethyl)-3,3',4,4'-tetracarboxydiphenylether, 5,5'-bis(trifluoromethyl)-3,3',4,4'-tetracaroxybenzophenone, bis{(trifluoromethyl)dicarboxyphenoxy)benzene, bis{(trifluoromethyl)dicarboxyphenoxy}(trifluoromethyl)benzene, bis(dicarboxyphenoxy)(trifluoromethyl)benzene, bis-(dicarboxyphenoxy)bis(trifluoromethyl)benzene, bis(dicarboxyphenoxy)tetrakis(trifluoromethyl)benzene, 3,4,9,10-tetracarboxyperylene, 2,2-bis{(4-(3,4-dicarboxyphenoxy)phenyl}propane, butanetetracarboxylic acid, cyclopentanetetracarboxylic acid, 2,2-bis {4-(3,4-dicarboxyphenoxy)phenyl}hexafluoropropane, bis{(trifluoromethyl)dicarboxyphenoxy}biphenyl, bis{(trifluoromethyl)dicarboxyphenoxy}bis(trifluoromethyl)biphenyl, bis{(trifluoromethyl) dicarboxyphenoxy}diphenylether, bis(dicarboxyphenoxy)bis(trifluoromethyl)biphenyl, bis(3,4-dicarboxyphenyl)dimethylsilane, 1,3-bis(3,4-dicarboxyphenyl)tetramethyldisiloxane, difluoropyromellitic acid, 1,4-bis(3,4-dicarboxytrifluorophenoxy)tetrafluorobenzene, 1,4-bis(3,4-dicarboxytrifluorophenoxy)octafluorobiphenyl.

Examples of a diamine include m-phenylenediamine, 2,4-diaminotoluene, 2,4-diaminoxylene, 2,4-diaminodurene, 4-(1H,1H,11H-eicosafluoroundecanoxy)-1,3-diaminobenzene, 4-(1H,1H-perfluoro-1-butanoxy)-1,3-diaminobenzene, 4-(1H,1H-perfluoro-1-heptanoxy)-1,3-diaminobenzene, 4-(1H,1H-perfluoro-1-octanoxy)-1,3-diaminobenzene, 4-pentafluorophenoxy-1,3-diaminobenzene, 4-(2,3,5,6-tetrafluorophenoxy)-1,3-diaminobenzene, 4-(4-fluorophenoxy)-1,3-diaminobenzene, 4-(1H,1H,2H,2H-perfluoro-1-hexanoxy)-1,3-diaminobenzene, 4-(1H,1H,2H,2H-perfluoro-1-dodecanoxy)-1,3-diaminobenzene, p-phenylenediamine, 2,5-diaminotoluene, 2,3,5,6-tetramethyl-p-phenylenediamine, 2,5-diaminobenzotrifluoride, bis(trifluoromethyl)phenylenediamine, diaminotetra(trifluoromethyl)benzene, diamino(pentafluoromthyl)benzene, 2,5-diamino (perfluorohexyl)benzene, 2,5-diamino(perfluorobuthyl)benzene, benzidine, 2,2'-dimethylbenzidine, 3,3'-dimethylbenzidine, 3,3'-dimethoxybenzidine, 2,2'-dimethoxybenzidine, 3,3',5,5'-tetramethylbenzidine, 3,3'-diacetylbenzidine, 2,2'-bis(trifluoromethyl)-4,4'diaminobiphenyl, octafluorobenzidine, 3,3'-bis(trifluoromethyl)-4,4'-diaminobiphenyl, 4,4'-diaminodiphenylether, 4,4'-diaminodiphenylmethane, 4,4'-diaminodiphenylsulfone, 2,2-bis(p-aminophenyl)propane, 3,3'-dimethyl-4,4'-diaminodiphenylether, 3,3'-dimethyl-4,4'-diaminodiphenylmethane, 1,2-bis(anilino)ethane, 2,2-bis(p-aminophenyl)hexafluoropropane, 1,3-bis(anilino)hexafluoropropane, 1,4-bis(anilino)octafluorobutane, 1,5-bis(anilino)decafluoropentane, 1,7-bis(anilino)tetradecafluoroheptane, 2,2'-bis(trifluoromethyl)-4,4'-diaminodiphenylether, 3,3'-bis(trifluoromethyl)-4,4'-diaminodiphenylether, 3,3',5,5'-terakis(trifluoromethyl)-4,4'-diaminodiphenylether, 3,3'-bis(trifluoromethyl)-4,4'-diaminobenzophenone, 4,4"-diamino-p-terphenyl, 1,4-bis(p-aminophenyl)benzene, p-bis(4-amino-2-trifluoromethylphenoxy)benzene, bis(aminophenoxy)bis(trifluoromethyl)benzene, bis(aminophenoxy)tetrakis (trifluoromethyl)benzene, 4,4'''-diamino-p-quarterphenyl, 4,4'-bis(p-aminophenoxy)biphenyl, 2,2-bis{4-(p-aminophenoxy)phenyl}propane, 4,4'-bis(3-aminophenoxy)phenyl)diphenylsulfone, 2,2-bis{4-(4-aminophenoxy)phenyl}hexafluoropropane, 2,2-bis{4-(3-aminophenoxy)phenyl}hexafluoropropane, 2,2-bis{4-(2-aminophenoxy)phenyl}hexafluoropropane, 2,2-bis{4-(4-aminophenoxy)-3,5-dimethylphenyl}hexafluoropropane, 2,2-bis{4-(4-aminophenoxy)-3,5-ditrifluoromethylphenyl}hexafluoropropane, 4,4'-bis(4-amino-2-trifluoromethylphenoxy)biphenyl, 4,4'-bis(4-amino-3-trifluoromethylphenoxy)biphenyl, 4'-bis(4-amino-2-trifluoromethylphenoxy)diphenylsulfone, 4,4'-bis(3-amino-5-trifluoromethylphenoxy)diphenylsulfone, 2,2-bis{4-(4-amino-3-trifluoromethylphenoxy)phenyl}hexafluoropropane, bis{(trifluoromethyl)aminophenoxy}biphenyl, bis[{(trifluoromethyl)aminophenoxy}phenyl]hexafluoropropane, diaminoanthraquinone, 1,5-diaminonaphthalene, 2,6-diaminonaphthalene, bis{2-(aminophenoxy)phenyl}hexafluoroisopropylbenzene, bis(2,3,5,6)-tetrafluoro-4-aminophenyl)ether, bis(2,3,5,6)-tetrafluoro-4-aminophenyl)sulfide, 1,3-bis(3-aminopropyl)tetramethyldisiloxane, 1,4-bis(3-aminopropyldimethylsilyl)benzene, bis(4-aminophenyl)diethylsilane, 1,3-diaminotetrafluorobenzene, 1,4-diaminotetrafluorobenzene, 4,4'-bis(tetrafluoroaminophenoxy)octafluorobiphenyl.

A fluorinated polyimide obtained from a tetracarboxylic dianhydride and a diamine, either one of, or both of which contain a fluorine atom combined thereto, is particularly preferably used in the present invention. Namely, either one of, or both of a fluorinated dianhydride and a fluorinated diamine are used to produce a polyimide.

The above mentioned embedded channel waveguide as shown in FIG. 1 can be manufactured by the following method.

A polyamic acid solution is spin-coated on a substrate such as of silicon, and is thermally cured to form a polyimide layer. An electron beam is irradiated on the entire surface of the polyimide layer to change the refractive index to a predetermined value. An electron beam-absorbed dose of the polyimide layer depends on the composition of the polyimide, an energy of the electron beam, and the applied amount of the electron beam irradiation. The refractive index changes in accordance therewith approximately.

This polyimide layer irradiated with the electron beam is used as a core layer.

Next, the same polyamic acid solution is spin-coated on the core layer, and is thermally cured. The material is separated from the substrate to obtain a polyimide film of a two-layer structure.

Then, the polyimide film of a two-layer structure is made to reverse and the irradiated polyimide layer is made to the upper surface. The lower surface of the reversed film is adhered by a method such as a thermocompression bonding on the other silicon substrate.

Next, the core layer is patterned into a desired shape, for example, a rectangular shape, by RIE (reactive ion etching) method.

Finally, the same polyamic acid solution is spin-coated over the patterned core layer, as an upper cladding layer, and is thermally cured, thereby preparing an embedded channel waveguide.

Figure 5:
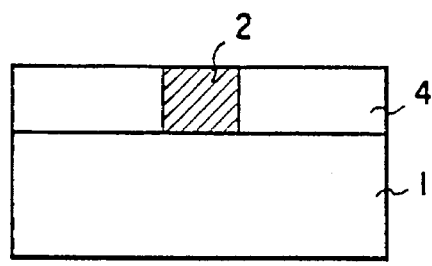
FIG. 5 is a sectional view showing one embodiment of a channel waveguide in which the core having rectangular section is embedded in one layer of the cladding of a two-layer structure.
Figure 6:
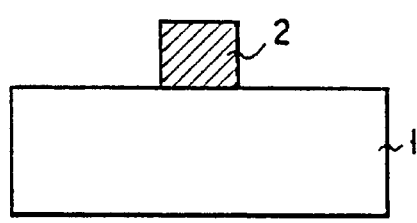
FIG. 6 is a sectional view showing one embodiment of a ridge channel waveguide having the structure of forming the core having rectangular section on the surface of the cladding of a one-layer structure.
Figure 7:
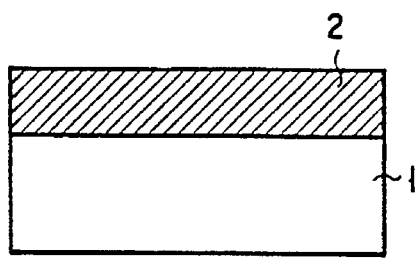
FIG. 7 is a sectional view showing one embodiment of a slab waveguide having the structure of laminating the core as the second layer on the surface of the cladding of a one-layer structure

The step of irradiating the entire surface of the polyimide layer with the electron beam, as described above, can be applied in forming an embedded channel waveguide, a ridge channel waveguide, and a slab waveguide, respectively shown in FIGS. 1, 6, and 7. Further, if a metal mask or the like is used, the irradiation step can be applied in forming an embedded channel waveguide and a channel waveguide as shown in FIGS. 2, 3, 4, and 5.

Figure 8:
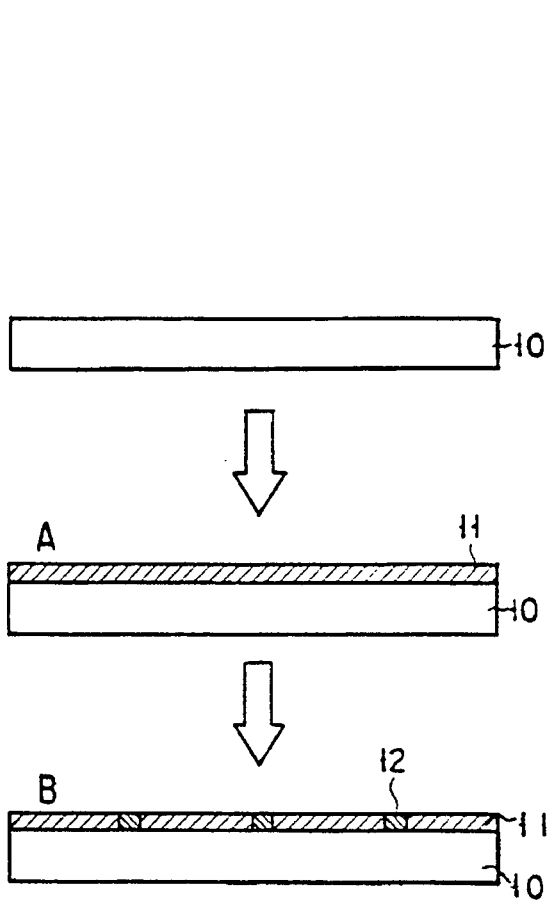
FIG. 8 is a view showing the steps of manufacturing the polyimide optical waveguide by performing electron beam lithography, which is one embodiment of the present invention.

In the above-mentioned process, the entire surface of the polyimide film is irradiated with the electron beam to form the core layer, and the RIE method is used at the time of forming the core. Alternatively, the electron beam irradiation is applied partially on the polyimide layer by using the metal mask or the like. However, for example, there is another method of forming the core having the predetermined refractive index and size in which electron beam lithography is applied selectively on the polyimide layer by means of an electron beam lithography system used in LSI manufacturing, without using the RIE processing. For example, a polyimide solution or a solution of a precursor thereof is applied by spin-coating on a silicon substrate 10, heated to remove the solvent, and cured if necessary, thereby to obtain a polyimide film 11 in step A as shown in FIG. 8. Next, the electron beam lithography is performed in step B shown in FIG. 8, to form a core 12 having the predetermined refractive index and size.

By these two steps B and C shown in FIG. 8, it is possible to obtain an optical waveguide approximately same as a ridge channel waveguide formed by using the conventional RIE method. That is, it is possible to reduce the number of steps. By using such electron beam lithography method, it is possible to obtain an embedded channel or channel waveguide as shown in FIGS. 2, 3, 4, and 5.

The structure of the optical waveguide manufactured by the above-mentioned process will be explained with reference to sectional views of FIGS. 2 to 7.

Figure 2:
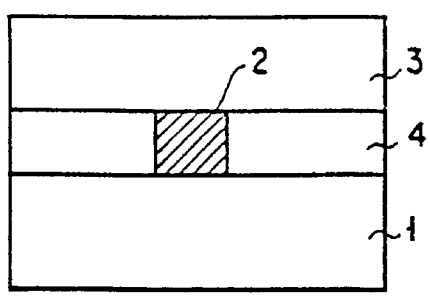
FIG. 2 is a sectional view showing one embodiment of an embedded channel waveguide in which the core having rectangular section is embedded in the second layer of the cladding of a three-layer structure.

FIG. 2 is a sectional view showing one embodiment of the embedded channel waveguide in which the core 2 having a rectangular section is embedded in the second layer of the cladding layers 1, 3, and 4 forming a three-layer structure.

Figure 3:
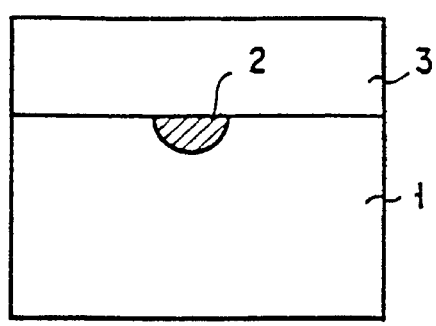
FIG. 3 is a sectional view showing one embodiment of an embedded channel waveguide in which the core having semicircle section is embedded in one layer of the cladding of a two-layer structure.

FIG. 3 is a sectional view showing one embodiment of the embedded channel waveguide in which the core having a semicircle section is embedded in one of the cladding layers forming a two-layer structure.

Figure 4:
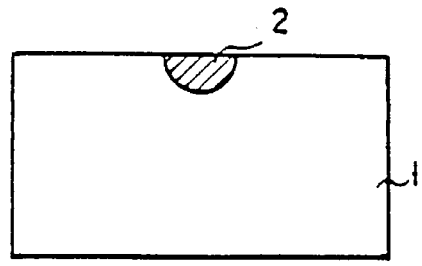
FIG. 4 is a sectional view showing one embodiment of a channel waveguide in which the core having semicircle section is embedded in the cladding of a one-layer structure.

FIG. 4 is a sectional view showing one embodiment of the channel waveguide, in which the core having a semicircle section is embedded in the cladding forming a one-layer structure. In this case, one of the cladding layers forming two-layer structure as shown in FIG. 3 can be of air.

FIG. 5 is a sectional view showing one embodiment of the channel waveguide in which the core having a rectangular section is embedded in one of the cladding layers forming a two-layer structure. In this case, the third cladding layer shown in FIG. 2 can be of air.

The structure of the optical waveguide in this invention is not limited to the embedded optical waveguide and the channel optical waveguide, both mentioned above. It can be applied for a ridge channel waveguide having the structure wherein the core having a rectangular section is mounted on the surface of the cladding having a one-layer structure, as shown in the sectional view of FIG. 6. Further, as shown in the sectional view of FIG. 7, it can be applied for a slab waveguide having the structure wherein the core used as the second layer is laminated on the surface of the cladding having a one-layer structure.

Furthermore, the manufacturing of a waveguide with a guiding condition such as single-mode or a multi-mode are realized by controlling a core-cladding refractive index ratio, using electron beam irradiation.

Further, even if the above-mentioned electron beam lithography system is not used, it is possible to form the core layer by irradiating the polyimide with the electron beam through an ordinary photomask.

Furthermore, as the means for forming an embedded channel waveguide, the core layer film can be sandwiched by polyimide films which will become claddings, and these components can be compressed or adhered through thin adhesive agent layers.

Hereinafter, the reference will be made to the specific Examples of the present invention. However, the present invention is not restricted to these Examples.

EXAMPLE 1

88.8 g (0.2 mol) of 2,2-bis(3,4-dicarboxyphenyl)-hexafluoropropane dianhydride, 64.0 g (0.2 mol) of 2,2'-bis(trifluoromethyl)-4,4'-diaminobiphenyl, and 1000 g of N,N-dimethylacetamide were added in a conical flask. The mixture was stirred for three days at the room temperature under nitrogen atmosphere to obtain a polyamic acid solution having a concentration of about 15% by weight. The polyamic acid solution was spin-coated on a silicon wafer, and heated at 70° C. for two hours, at 160° C. for one hour, at 250° C. for 30 minutes, and at 380° C. for one hour in an oven to imidize it, thereby obtaining a polyimide layer with 10 μm thickness. As a result of measuring the refractive index of the film at wavelength of 1.3 μm, the refractive index in the direction parallel to the film surface (TE) was 1.521 and the refractive index in the direction perpendicular to the film surface (TM) was 1.513. Further, a thermal expansion coefficient was $8.2 \times 10^{-5}$ and a glass transition temperature was 335° C.

The polyimide layer formed on the silicon substrate was irradiated with the electron beam having an energy of 400

Kev for about 30 minutes at room temperature at a dose of $5×10^{15}$ e/cm². The measured refractive indices of this polyimide layer were 1.526 for TE direction and 1.517 for TM direction respectively. Further, the thermal expansion coefficient was $8×10^{-5}$, and the glass transition temperature was 330° C.

After the same polyamic acid solution was spin-coated on the electron-beam irradiated polyimide, the solution was heated at 70° C. for two hours, at 160° C. for one hour, at 250° C. for 30 minutes, and at 380° C. for one hour in the oven for imidization, thereby obtaining a polyimide film having a thickness of 30 μm and a two-layer structure. This polyimide film was separated from the silicon substrate, the irradiated polyimide surface was made to be an upper layer, and the lower layer was adhered to another silicon substrate.

Next, using an electron beam vapor deposition system, a 0.3 μm thick aluminum film was formed on the polyimide film. After an usual positive resist was applied by the spin-coating method, prebake was performed. Then, ultraviolet rays were applied through a mask for forming a pattern having a line width of 10 μm and a length of 60 mm by using an ultra-high pressure mercury lamp, and the resist was developed by using a developer for positive resist. Thereafter, afterbake was performed. Next, the aluminum film was wet etched at each portion not coated with the resist. After washing and drying, the RIE processing of the polyimide was performed by using a dry etching system. The aluminum remaining on the polyimide was removed by applying the above-mentioned etching solution to obtain a ridge channel waveguide having a core width of 10 μm.

Further, the same polyamic acid solution was spin-coated on the ridge channel waveguide, and was heated at 70° C. for two hours, at 160° C. for one hour, at 250° C. for 30 minutes, and at 380° C. for one hour in the oven to achieve imidization. Thus, an upper cladding layer was formed. In this manner, an embedded channel waveguide was obtained in which the core-cladding refractive index ratio was almost same at TE and TM (0.005 for TE, 0.004 for TM). Further, the core and the cladding of this waveguide had almost the same thermal properties.

As mentioned above, it is possible to manufacture a polyimide optical waveguide whose core and cladding have almost the same thermal properties and birefringence.

Next, another method of manufacturing a polyimide optical waveguide, using the polyimide multi-layer film of the present invention, will be described with reference to another embodiment.

Figure 9:
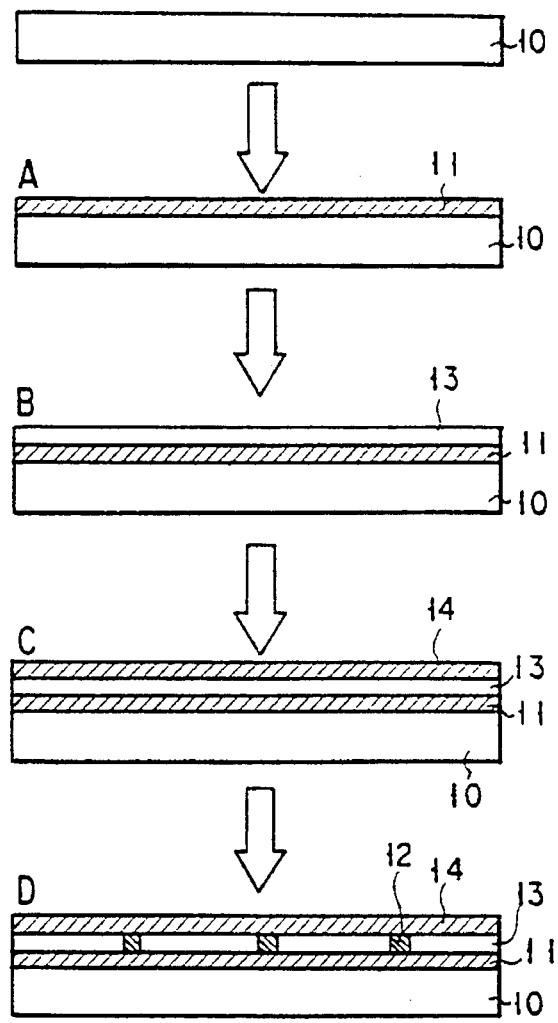
FIG. 9 is a view showing the steps of manufacturing an embedded channel polyimide optical waveguide having a three-layer structure which is one embodiment of the present invention.
Figure 10:
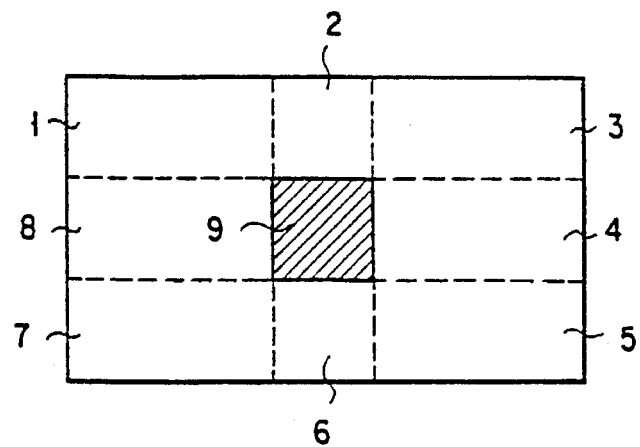
FIG. 10 is a sectional view of an embedded channel polyimide optical waveguide of three-layer structure, which is one embodiment of the present invention.

FIG. 9 is a view showing the steps in forming an embedded channel waveguide having a three-layer structure, according to the present invention. FIG. 10 is a sectional view of the embedded channel waveguide. According to the method of the present invention, it is possible to form the waveguide in four steps. Unlike in the conventional method using the RIE method, it is possible to reduce the number of steps. Namely, a polyimide solution or a precursor solution is coated by, for example, spin-coating method on the substrate 10 of silicon or the like, in the step A shown in FIG. 9. The solution is heated to remove the solvent, and cured, if necessary, thereby to obtain a first polyimide layer as shown in step B shown in FIG. 9. Then, a second polyimide layer 13 is formed on the first polyimide layer 11, in step C shown in FIG. 9 by using a polyimide material whose refractive index is larger than that of the first layer. Further, a third polyimide layer 14 is formed on the second polyimide layer 13 in step D shown in FIG. 9 by using a polyimide material whose refractive index is smaller than that of the second layer 13. The desired pattern is drawn on the polyimide film having the three-layer structure with an electron beam, so as to have a predetermined refractive index and a predetermined size. The relationship of refractive indices of these polyimide layers is n1<n2, and n3<n2, where the refractive index of the first polyimide layer is n1, that of the second polyimide layer is n2, and that of the third polyimide layer is n3. If changes of the refractive indices of the three polyimide layers are represented by Δn1, Δn2, and Δn3, respectively, by the electron beam irradiation, the refractive index change of a region 1 of FIG. 10 is n3, that of a region 2 is n3+Δn3, that of a region 3 is n3, that of a region 4 is n2, that of a region 5 is n1, that of a region 6 is n1+Δn1, that of a region 7 is n1, that of a region 8 is n2, and that of a region 9 is n2 +Δn2. The materials and the irradiation condition are selected such that each difference (Δn1−Δn2, Δn2−Δn3, Δn3−Δn1) of the refractive index change Δn1, Δn2, Δn3 caused by the electron beam irradiation is less than the refractive index difference between the original materials. Hence, the region 9 having the largest refractive index becomes the core in which the light is confined and guided.

When the electron beam is applied onto the polyimide film, measures are taken, if necessary, to prevent deflection of the electron beam caused by a charge of a static electricity. To this end, for example, a conductive film may be deposited on the polyimide film, or a conductive mesh may be compressed on the polyimide film.

Furthermore, it is possible to perform various pretreatments for the material to be irradiated with the electron beam. For example, the material can be left in the atmosphere which is filled with a substance and be irradiated with an electron beam to perform the electron beam irradiation effectively. It is possible to set the pretreatment conditions freely in accordance with the objective.

After the core is formed by the electron beam lithography, if the core is sandwiched, at its upper and lower sides, between by the polyimide layers having lower refractive indices than that of the core, it is possible to obtain an embedded channel waveguide. The core is sandwiched through adhesive layers, by using thermocompression bonding, or by using spin-coating.

The optical waveguide may have various shapes; it can be a linear, curved, folded, S-shpaed, tapered, branched, or crossing optical directional coupler. It can be a two-mode waveguide coupler, or a grating. Further, the width of the core can be set freely.

Hereinafter, the present invention will be described in detail, with reference to Examples. However, the present invention is not limited to these Examples. Typical Examples will be shown below though it is possible to manufacture the various kinds of polyimide optical waveguide by combining materials and shapes in various ways.

EXAMPLE 2

88.8 g (0.2 mol) of 2,2-bis(3,4-dicarboxyphenyl)-hexafluoropropane dianhydride, 64.0 g (0.2 mol) of 2,2-bis(trifluoromethyl)-4,4'-diaminobiphenyl, and 1000 g of N,N-dimethylacetamide were added in a conical flask. The mixture was stirred for three days at room temperature under nitrogen atmosphere to obtain a polyamic acid solution having a concentration of about 15% by weight. After the polyamic acid solution was spin-coated on a silicon wafer, it was heated at 70° C. for two hours, at 160° C. for one hour, at 250° C. for 30 minutes, and at 350° C. for one hour in an oven to achieve imidization, thereby forming a polyimide layer with 10 μm thickness. Then, aluminum was deposited on the polyimide layer to a thickness of 10 nm within a vacuum deposition system, and the resultant structure was introduced into an electron beam lithography system.

Further, a pattern having a width of 8 μm and a length of 66 mm was drawn on the polyimide layer by using an electron beam having energy of 25 Kev at a dose of 1500 μC/cm$^2$.

Thereafter, the aluminum film was removed by using an etching solution to obtain a polyimide optical waveguide. End of the obtained polyimide optical waveguide was optically polished, and a light having a wavelength of 633 nm was introduced thereinto. It was confirmed that the light was confined in the core and was guided. Further a light having a wavelength of 1.3 μm was introduced within the core of the waveguide via a single mode optical fiber, and the output light was received by a multi-mode optical fiber. When the intensity of the output light was measured, it was confirmed that the loss was 1 dB/cm or less, including the coupling loss.

EXAMPLE 3

Aluminum was deposited on the polyimide film formed in the same way as in Example 2, and was introduced into the electron beam lithography system.

A pattern having a width of 10 μm and a length of 66 mm was drawn on the film by using an electron beam having energy of 25 Kev at a dose of 900 μC/cm$^2$.

Thereafter, the loss of the light having 1.3 μm of wavelength was measured for the waveguide prepared in this Example. It was 1 dB/cm or less, including the coupling loss.

EXAMPLE 4

88.8 g (0.2 mol) of 2,2-bis(3,4-dicarboxyphenyl)-hexafluoropropane dianhydride 64.0 g (0.2 mol) of 2,2-bis(trifluoromethyl)-4,4'-diaminobiphenyl, and 1000 g of N,N-dimethylacetamide was added in a conical flask. The mixture was stirred for three days at room temperature under nitrogen atmosphere to obtain a polyamic acid solution having a concentration of about 15% by weight (hereinafter referred to as Solution A). Solution A was spin-coated on an optically polished aluminum plate and heated at 70° C. for two hours, at 160° C. for one hour, at 250° C. for 30 minutes, and at 350° C. for one hour in the oven to achieve imidization, thereby forming a polyimide layer having a thickness of 10 μm. The mean refractive index of this layer relative to light having a wavelength of 1.3 μm was 1.519.

Instead of 0.2 mol of 2,2-bis(3,4-dicarboxyphenyl)-hexafluoropropane dianhydride, 0.14 mol of 2,2-bis (3,4-dicarboxyphenyl)hexafluoropropane dianhydride and 0.06 mol of pyromellitic acid dianhydride were used to prepare a polyamic acid solution (hereinafter referred to as Solution B) and a polyimide layer in the manner described above. The refractive index of this layer exhibited to the light having 1.3 μm wavelength was 1.527.

Solution A was spin-coated on an optically polished aluminum substrate, such that a cured layer has a thickness of 20 μm. The solution was heated at 70° C. for two hours, at 160° C. for one hour, at 250° C. for 30 minute, and at 380° C. for one hour in the oven to obtain a first polyimide layer. Further, Solution B was spin-coated thereon such that a cured layer has a thickness of 8 μm, and a second polyimide layer was prepared under the same curing condition. Aluminum was deposited to a thickness of 10 nm on the film having the two-layer structure in the vacuum deposition system, and the resultant structure was introduced into the electron beam lithography system. The polyimide film was irradiated with an electron beam having energy of 25 keV, over a width of 8 μm and a length of 66 mm, at a dose of 1500 μC/cm$^2$. Then, the aluminum film was removed by an etching solution, thereby obtaining a polyimide optical waveguide.

The end of the obtained polyimide optical waveguide were optically polished, and a light having a wavelength of 633 nm was introduced thereinto. It was confirmed that the light was confined in the second layer and was guided. Further, a light having a wavelength of 1.3 μm was found to be confined in the region (8 μm×8 μm) and be guided to the output end of the waveguide.

EXAMPLE 5

Solution A was spin-coated on the film having the two-layer structure prepared in the same way as in Example 4, and thermally cured under the same curing conditions to form a third polyimide layer having a thickness of 20 μm.

On the thus obtained polyimide film having the three-layer structure, the electron beam lithography was performed in the same manner as in Example 4, by using the electron beam lithography system.

The end of the obtained polyimide optical waveguide was optically polished, and a light having a wavelength of 633 nm was introduced thereinto. It was confirmed that the light was confined in the second layer and was guided. Further, as for the light having a wavelength of 1.3 μm, it was confirmed that the light was confined in the region of 8 μm×8 μm, and was guided to the another end of the waveguide.

EXAMPLE 6

On the film having a three-layer structure prepared in the same way as in Example 5, Solution B was spin-coated so as to obtain a thickness of 8 μm after the heat curing, and cured under the same curing condition to form a fourth layer. Further, Solution A was spin-coated thereon so as to obtain a thickness of 20 μm after the heat curing, and cured under the same curing condition to form a fifth layer.

Electron beam lithography was performed on the polyimide film having the five-layer structure in the same condition as in Example 4, by using the electron beam lithography system.

The end of the obtained polyimide optical waveguide having the multi-layer structure was optically polished, and a light having a wavelength of 633 nm was introduced thereinto. It was confirmed that the light was confined in the second and fourth layers. Further, as for the light having a wavelength of 1.3 μm, it was confirmed that the light was confined in the regions of 8 μm×8 μm of the second and fourth layers and was guided to the another end of the waveguide.

EXAMPLE 7

Solution A was spin-coated on a film having a two-layer structure prepared in the same way as in Example 4, so as to obtain a thickness of 20 μm after the heat curing, and cured under the same curing condition to form a third layer. Aluminum was deposited to a thickness of 10 nm on the film having the three-layer structure within the vacuum deposition system. The resultant structure was introduced into the electron beam lithography system. Then, this film was irradiated with an electron beam having energy of 50 keV, over a region of 8 μm (width)×66 mm (length) at a dose of 1500 μC/cm². Thereafter, the aluminum film was removed by using an etching solution to obtain a polyimide optical waveguide.

The end of the obtained polyimide optical waveguide was polished optically, and a light having a wavelength of 633 nm was introduced thereinto. It was confirmed that the light was confined in the second layer and was guided. Further, as for the light having a wavelength of 1.3 μm, it was confirmed that the light was confined in the region of 8 μm×8 μm, and was guided to the another end of the waveguide.

EXAMPLE 8

On a film having a three-layer structure prepared in the same way as in Example 5, Solution B was spin-coated so as to obtain a thickness of 8 μm after the heat curing, and cured under the same curing condition to form a fourth layer. Further, Solution A was spin-coated thereon so as to obtain a thickness of 10 μm after the heat curing, and cured under the same curing condition to form a fifth layer.

Electron beam lithography was performed on the polyimide film having the five-layer structure, in the same way as in Example 7, by using the electron beam lithography system.

An end of the obtained polyimide optical waveguide having the multi-layer structure was polished optically, and light having a wavelength of 633 nm was applied to the end. It was confirmed that the light was confined in the second and fourth layers and was guided. As for the light having a wavelength of 1.3 μm, it was confirmed that the light was confined in the regions of 8 μm×8 μm of the second and fourth layers and was guided to the another end of the waveguide.

Next, a method of preparing the polyimide optical waveguide according to another embodiment of the present invention will be described with reference to FIG. 11.

Figure 11:
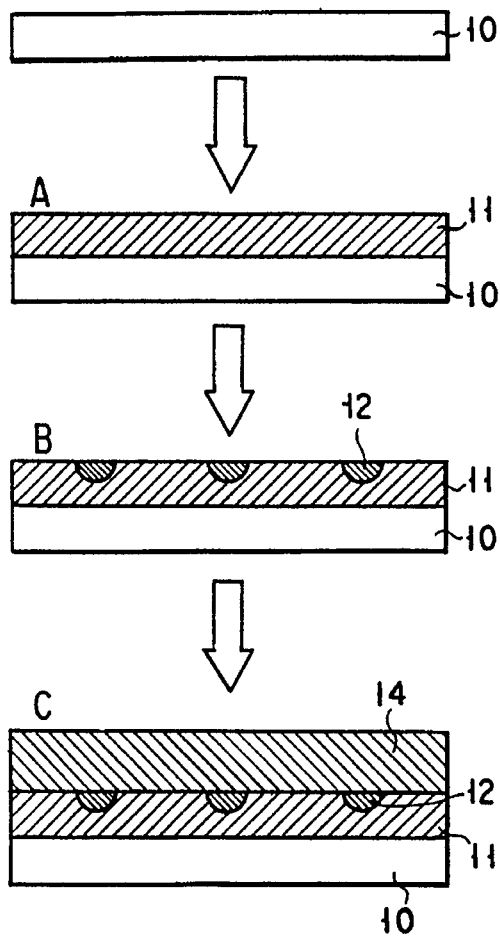
FIG. 11 is a view showing the steps of manufacturing an embedded channel waveguide of a two-layer structure by an electron beam irradiation, which is another embodiment of the present invention.

After a polyimide solution or a polyamic acid solution was applied by spin-coating on a substrate 10 as shown in FIG. 11, the resultant structure was heated, the solvent was removed, and the structure was cured, if necessary, thereby to obtain a polyimide film 11 in step A shown in FIG. 11. Then, an electron beam energy was selected, and the electron beam was applied to the film 11, thus changing the refractive index of the film 11 to a predetermined value and forming the predetermined size thereof, to form a core 12 having the predetermined depth in step B shown in FIG. 11. The electron beam must be applied in such a condition as not to permeate to the rear surface of the polyimide film 11. In this manner, a channel waveguide can be prepared.

Further, it is possible to form an upper cladding 14 in step C shown in FIG. 11 by means of spin-coating a polyimide solution or a polyamic acid solution on the lower cladding.

With the manufacturing method described above, it is possible to omit the step of bonding the polyimide films and to omit the step of performing spin-coating on the polyimide film separated from the substrate. This further simplifies the manufacturing method.

In the steps A to C shown in FIG. 11, the polyimide material can be treated in various ways before electron beam irradiation. For example, the electron beam irradiation can be achieved effectively by holding the material in an atmosphere filled with a substance. It is possible to perform pretreatment freely, in accordance with the objective.

As for the shape of the optical waveguide, the path can be a liner, curved, folded, S-shaped, tapered, branched or crossing optical direction coupler. Furthermore, it can be a two-mode waveguide coupler, or a grating. Further, the core can have any width and depth desired.

Specific examples will be explained. Although it is possible to manufacture the various kinds of polyimide optical waveguides by changing the combination of the material and the shape, typecial examples are as follows.

EXAMPLE 9

88.8 g (0.2 mol) of 2,2-bis(3,4-dicarboxyphenyl)-hexafluoropropane dianhydride, 64.0 g (0.2 mol) of 2,2-bis(trifluoromethyl)-4,4'-diaminobiphenyl, and 1000 g of N,N-dimethylacetamide were added in a conical flask. The mixture was stirred for three days at room temperature under nitrogen atmosphere to obtain polyamic acid having a concentration of about 15% by weight. The polyamic acid solution was spin-coated on a silicon wafer, and heated at 70° C. for two hours, at 160° C. for one hour, at 250° C. for 30 minutes, and at 350° C. for one hour in an oven, to achieve imidization. Thus, a polyimide film having a thickness of 50 μm was obtained. This film was introduced into an electron beam lithography system.

Then, this film was irradiated with an electron beam having energy of 10 kev at a dose of 1500 μC/cm², thus forming a pattern having a width of 8 μm and a length of 60 mm.

An end of the polyimide optical waveguide, thus formed was polished optically, and a light having a wavelength of 1.3 μm was introduced thereinto. When the other end of the waveguide was observed by using a microscope with an infrared camera, it was confirmed that the light was confined in the waveguide.

EXAMPLE 10

88.8 g (0.2 mol) of 2,2-bis(3,4-dicarboxyphenyl)-hexafluoropropane dianhydride, 64.0 g (0.2 mol) of 2,2-bis(trifluoromethyl)-4,4'-diaminobiphenyl, and 1000 g of N,N-dimethylacetamide were added in a conical flask. The mixture was stirred for three days at room temperature under nitrogen atmosphere, to obtain a polyamic acid solution having a concentration of about 15% by weight. This polyamic acid solution was spin-coated on a silicon wafer, and heated at 70° C. for two hour, at 160° C. for one hour, at 250° C. for 30 minutes, and at 350° C. for one hour in the oven to achieve imidization. Thus, a polyimide layer having a thickness of 50 μm was obtained. This layer was introduced into an electron beam lithography system.

Then, an electron beam having an energy of 10 kev was applied onto this film at a dose of 1500 C/cm², thereby forming a pattern having a width of 8 μm a length of 60 mm.

Thereafter, the polyamic acid solution was spin-coated on the polyimide layer formed above and cured to obtain an embedded channel polyimide optical waveguide. The end of the polyimide optical waveguide was polished optically, and light having a wavelength of 1.3 μm was introduced thereinto. When the another end of the waveguide was observed using a microscope with an infrared camera, it was confirmed that the light was confined in the core of the waveguide.

This embedded channel polyimide optical waveguide could be made in only three steps, in less steps than in the conventional method. Further, it could be manufactured without bonding between polyimide films and without performing spin-coating on the separated polyimide film.

Embodiments of the polyimide optical waveguides having two or more polyimide layers, and a method of manufacturing waveguides, wherein cores and cladding are formed alternately in the predetermined regions of the layers will be explained with reference to FIGS. 12 to 29.

Figure 12:
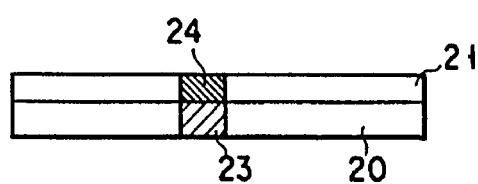
FIG. 12 is a sectional view of a subject portion of a polyimide optical waveguide of a two-layer structure, which is still another embodiment of the present invention.

FIG. 12 is a sectional view of the subject portion of a polyimide optical waveguide having a two-layer structure. The optical waveguide has a polyimide layer 20 having a predetermined refractive index. A second polyimide layer 21 having a refractive index higher than that of the polyimide layer 20 is formed on the layer 20. A cladding 23 is formed in the polyimide layer 20 by applying an electron beam from the upper side to the predetermined region, and a core 24 is formed in the polyimide layer 21.

The process of manufacturing the core and the cladding of the waveguide shown in FIG. 12 will be described with reference to FIG. 13.

Figure 13:
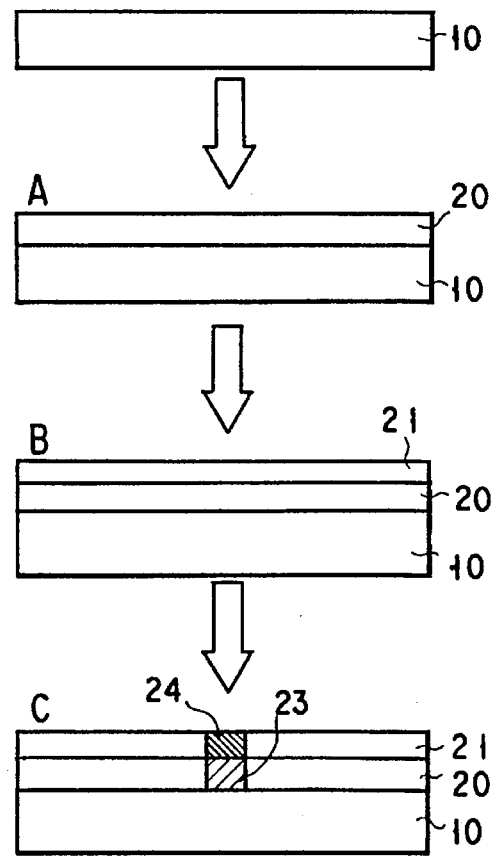
FIG. 13 is a view showing the steps of manufacturing the polyimide optical waveguide shown in FIG. 12.

The polyimide layer 20 is formed on the substrate in step A shown in FIG. 13, and the polyimide layer 21 is formed on the layer 20 in step B shown in FIG. 13. Then, an electron beam is directed from above the upper side of the polyimide layer 21 and hence to the substrate 10. The cladding 23 is thereby formed in the polyimide layer 20, and the core 24 is thus formed in the second polyimide layer 21 over the region irradiated with the electron beam, in step C shown in FIG. 13.

Figure 14:
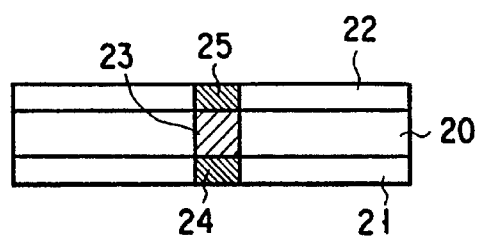
FIG. 14 is a sectional view showing the subject portion of a polyimide optical waveguide of a three-layer structure, which is another embodiment of the present invention.

FIG. 14 is a sectional view of the subject portion of a polyimide optical waveguide having a three-layer structure. The waveguide has a polyimide layer 21 having a predetermined refractive index. A second polyimide layer 20 having a refractive index lower than that of the polyimide layer 21 is formed on the layer 21. Further a third polyimide layer 22 having a refractive index higher than that of the second polyimide layer 20 is formed on the second polyimide layer 20. A core 24 is formed in the polyimide layer 21 by applying an electron beam onto the upper side and hence to the substrate 10. A cladding 23 is formed in the polyimide layer 20, and another core 25 is formed in the polyimide layer 22.

The process of manufacturing the core and the cladding of the waveguide shown in FIG. 14 will be described with reference to FIG. 15.

Figure 15:
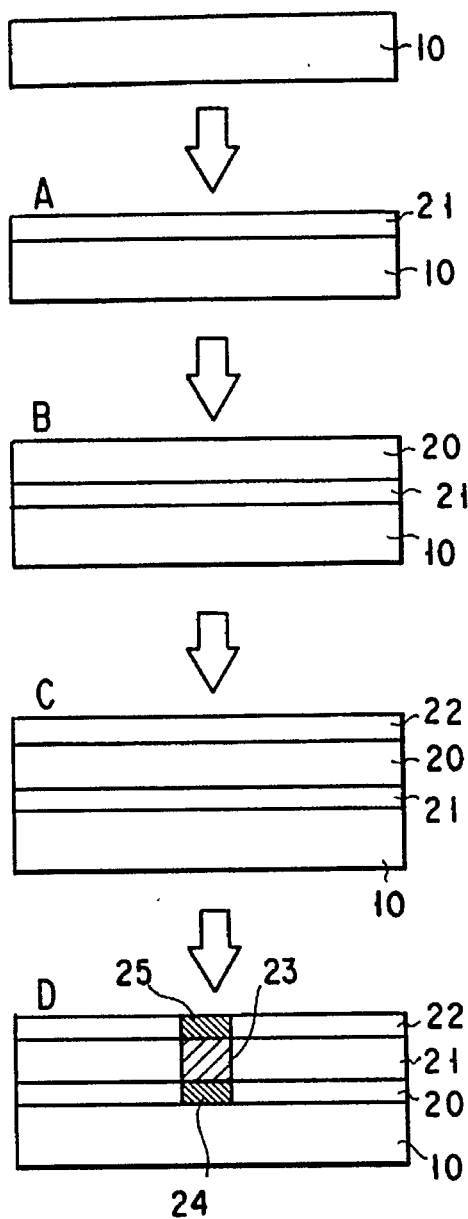
FIG. 15 is a view showing the steps of manufacturing the polyimide optical waveguide shown in FIG. 14.

The polyimide layer 21 is formed on the substrate in step A shown in FIG. 15. The second polyimide layer 20 is formed on the polyimide layer 21 in step B shown in FIG. 15. Further, in step C shown in FIG. 15, the third polyimide layer 22 is formed on the second polyimide layer 20.

Then, in step D shown in FIG. 15, an electron beam is directed from above the upper side of the polyimide layer 22 and hence to the substrate 10. The core 24 is thereby formed in the polyimide layer 20, the cladding 23 is thereby formed in the second polyimide layer 21, and the core 25 is formed in the third polyimide layer 22 over the region irradiated with the electron beam in step D shown in FIG. 15.

Figure 16:
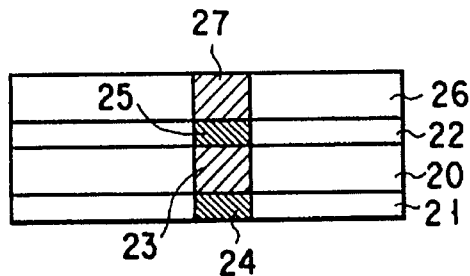
FIG. 16 is a sectional view showing the subject portion of a polyimide optical waveguide of a four-layer structure, which is still another embodiment of the present invention.

FIG. 16 is a sectional view of the subject portion of a polyimide optical waveguide having a four-layer structure. A second polyimide layer 20 having a refractive index lower than that of the polyimide layer 21 is formed on a first polyimide layer 21 having a predetermined refractive index. A third polyimide layer 22 having a refractive index higher than that of the second polyimide layer 20 is formed on the second polyimide layer 20, and the fourth polyimide layer 26 having a refractive index lower than that of the polyimide layer 22 is formed on the third polyimide layer 22. In a prescribed region, a core 24 formed by irradiating the upper side with an electron beam is located in the polyimide layer 21, a cladding 23 is formed in the polyimide layer 20, a core 25 is formed in the polyimide layer 22, and a cladding 27 is formed in the polyimide layer 26.

The process of manufacturing the cores and the claddings of the waveguide shown in FIG. 16 will be explained with reference to FIG. 17.

Figure 17:
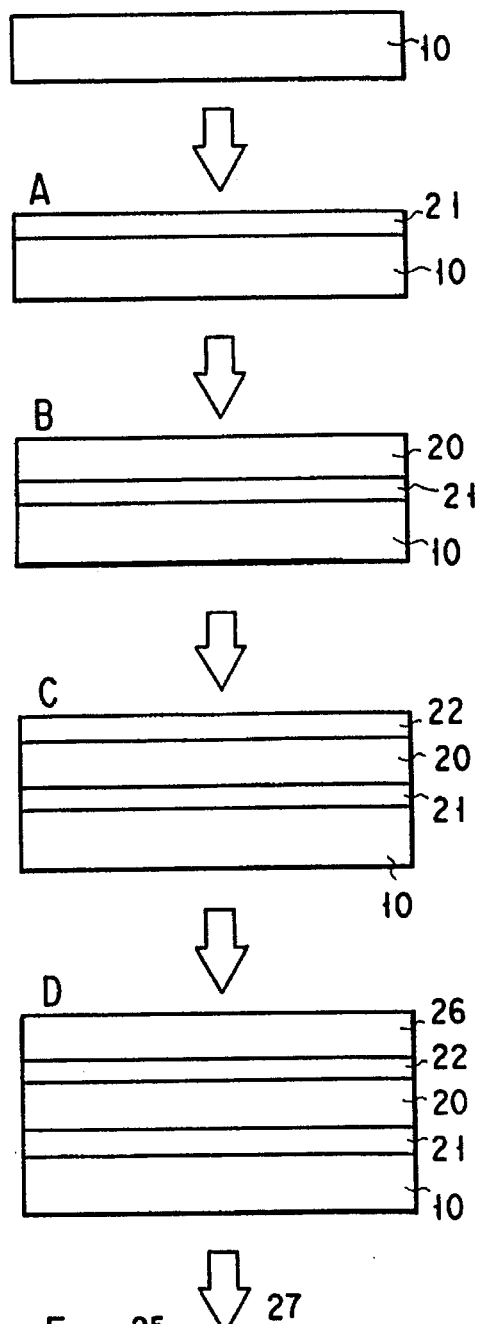
FIG. 17 is a view showing the steps of manufacturing the polyimide optical waveguide shown in FIG. 16.

The polyimide layer 21 is formed on the substrate in step A shown in FIG. 17. The second polyimide layer 20 is formed on the polyimide layer 21 in step B shown in FIG. 17. Further, in step C shown in FIG. 17, the third polyimide layer 22 is formed on the second polyimide layer 20. Then, in step D shown in FIG. 17, the fourth polyimide layer 26 is formed on the third polyimide layer 22.

In step E shown in FIG. 17, an electron beam is applied to the upper side of the polyimide layer 26 and hence to the substrate 10. As a result, the core 24 is formed in the polyimide layer 21, the cladding 23 is formed in the second polyimide layer 20, the core 25 is formed in the third polyimide layer 22, and the cladding 27 is formed in the fourth polyimide layer 26, over the region irradiated with the electron beam.

Figure 18:
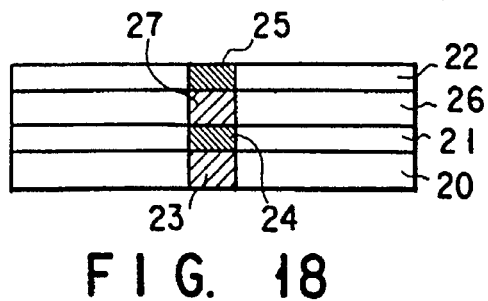
FIG. 18 is a sectional view of the subject portion of showing another polyimide optical waveguide of a four-layer structure.

Next, another embodiment of a polyimide optical waveguide having a four-layer structure will be described with reference to the sectional view of FIG. 18.

On a polyimide layer 20 having a predetermined refractive index, a second polyimide layer 21 having a refractive index higher than that of the polyimide layer 20 is formed. A third polyimide layer 26 having a refractive index lower than that of the second polyimide layer 21 is formed on the second polyimide layer 21, and the fourth polyimide layer 22 having a refractive index higher than that of the polyimide layer 26 is formed on the third polyimide layer 26. A cladding 23 is formed in the polyimide layer 21 by irradiating an electron beam to the upper side and hence to a predetermined region. A cladding 27 is formed in the polyimide layer 26, and the core 25 is formed in the polyimide layer 22.

The step of manufacturing the cores and the claddings of the waveguide shown in FIG. 18 will be explained with reference to FIG. 19.

Figure 19:
FIG. 19 is a view showing the steps of manufacturing the polyimide optical waveguide shown in FIG. 18.
Figure 19:
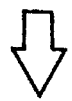
Figure 19:
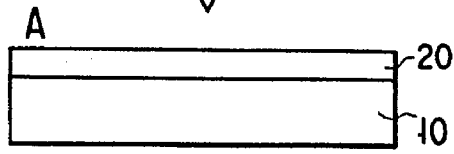
Figure 19:
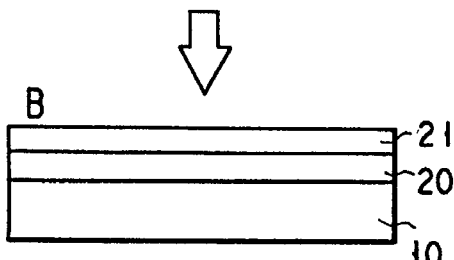
Figure 19:
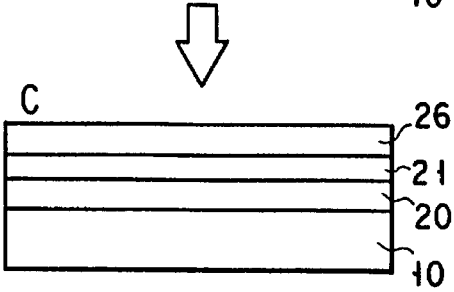
Figure 19:
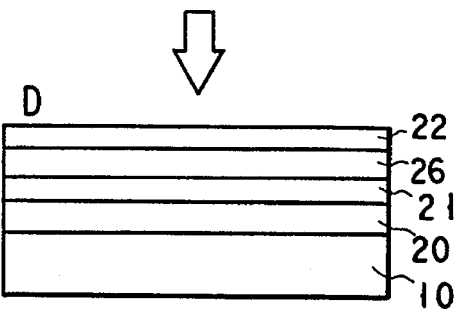
Figure 19:
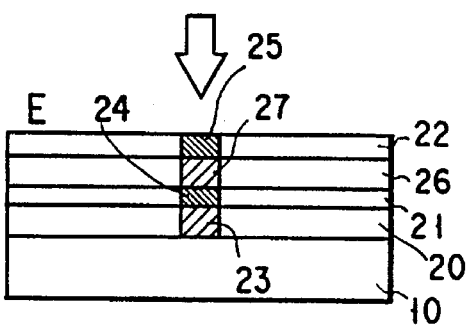

The polyimide layer 20 is formed on the substrate 10, in step A shown in FIG. 19. The second polyimide layer 21 is formed on the polyimide layer 20 in step B shown in FIG. 19. Further, in step C shown in FIG. 19, the third polyimide layer 26 is formed on the second polyimide layer 21. As shown in step D shown in FIG. 19, the fourth polyimide layer 22 is formed on the third polyimide layer 26.

Then in step E shown in FIG. 19, an electron beam is applied to the upper side of the polyimide layer 22 and hence to the substrate 10. As a result, the cladding 23 is formed in the polyimide layer 20, the core 24 is formed in the second polyimide layer 21, the cladding 27 is formed in the third polyimide layer 26, and the core 25 is formed in the fourth polyimide layer 22, over the region irradiated with the electron beam.

Figure 20:
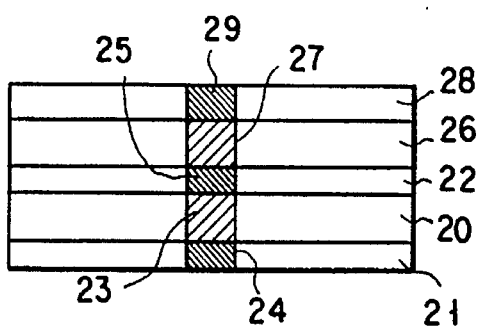
FIG. 20 is a sectional view of the subject portion of the polyimide optical waveguide of a five-layer structure, which is another embodiment of the present invention.

FIG. 20 is a sectional view of the subject portion of a polyimide optical waveguide having a five-layer structure, wherein a fifth polyimide layer 28 is formed on the fourth layer 26 of the waveguide of FIG. 16. The fifth layer 28 has a refractive index higher than that of the fourth layer 26. A core 24 is formed in the polyimide layer 21 by applying an electron beam to the upper side of the fifth polyimide layer 28. A cladding 23 is formed in the polyimide layer 20, a core 25 is formed in the polyimide layer 22, a cladding 27 is formed in the polyimide layer 26, and a core 29 is formed in the fifth polyimide layer The steps of manufacturing the cores and the claddings of the polyimide optical waveguide shown in FIG. 20 will be explained with reference to FIG. 21.

The polyimide layer 21 is formed on the substrate in step A shown in FIG. 21. The second polyimide layer 20 is formed on the polyimide layer 21 in step B shown in FIG. 21. Further, in step C shown in FIG. 21, the third polyimide layer 22 is formed on the second polyimide layer 20. In step D shown in FIG. 21, the fourth polyimide layer 26 is formed on the third polyimide layer 22. Then, in step E shown in FIG. 21, the polyimide layer 28 is formed on the polyimide layer 26.

In step F shown in FIG. 21, an electron beam is applied to the upper side of the fifth polyimide layer 28 and hence to the substrate 10. As a result, the core 24 is formed in the polyimide layer 21, the cladding 23 is in the second polyimide layer 20, the core 25 is in the third polyimide layer 22, the cladding 27 is in the fourth polyimide layer 26, and the core 29 is in the fifth polyimide layer 28.

Figure 22:
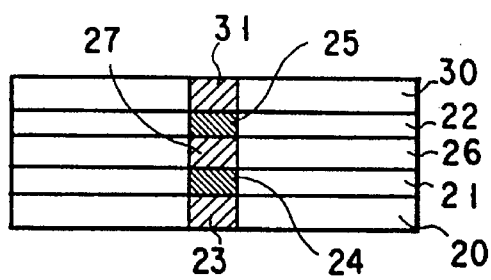
FIG. 22 is a sectional view of the subject portion for showing another embodiment of the polyimide optical waveguide of a five-layer structure.

A further embodiment of a polyimide optical waveguide having a five-layer structure will be described with reference to the sectional view of FIG. 22.

The first to fourth layers of this embodiment are formed in the same way as the layers of the polyimide optical waveguide (FIG. 19) having a four-layer structure, which are formed in steps A to D shown in FIG. 19.

A step E shown in FIG. 23 is the step of forming the fifth polyimide layer 30 having a refractive index lower than that of the polyimide layer 22, on the fourth polyimide layer 22.

An electron beam is applied to the upper side of the fifth polyimide layer 30 and hence to the substrate 10 in step F shown in FIG. 23, a cladding 23 is formed in the polyimide layer 20, a core 24 is in the second polyimide layer 21, a cladding 27 is in the third polyimide layer 26, a core layer 25 is in the fourth polyimide layer 22, and a cladding 31 is in the fifth polyimide layer 30, over the region irradiated with the electron beam.

Figure 24:
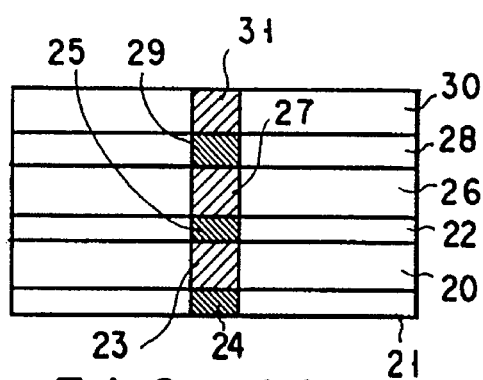
FIG. 24 is a sectional view of the subject portion of a polyimide optical waveguide of a six-layer structure, which is a further embodiment of the present invention

FIG. 24 is a sectional view of the subject portion of a polyimide optical waveguide having a six-layer structure, wherein a sixth polyimide layer 30 is formed on the fifth polyimide layer 28 of the waveguide of FIG. 20. The sixth layer 30 has a refractive index lower than that of the fifth layer. A core 24 is formed in the polyimide layer 21 by applying an electron beam to the upper side of the sixth polyimide layer 30. A cladding 23 is formed in the polyimide layer 20, a core 25 is in the polyimide layer 22, a cladding 27 is in the polyimide layer 26, a core 29 is in the fifth polyimide layer 28, and a cladding 31 is in the sixth polyimide layer 30.

The step of manufacturing the cores and the claddings of the waveguide shown in FIG. 24 will be explained with reference to FIG. 25.

The first to fifth layers of this embodiment are formed in the same way as the layers of the polyimide optical waveguide (FIG. 21) having a five-layer structure are formed in steps A to E shown in FIG. 21.

Figure 25:
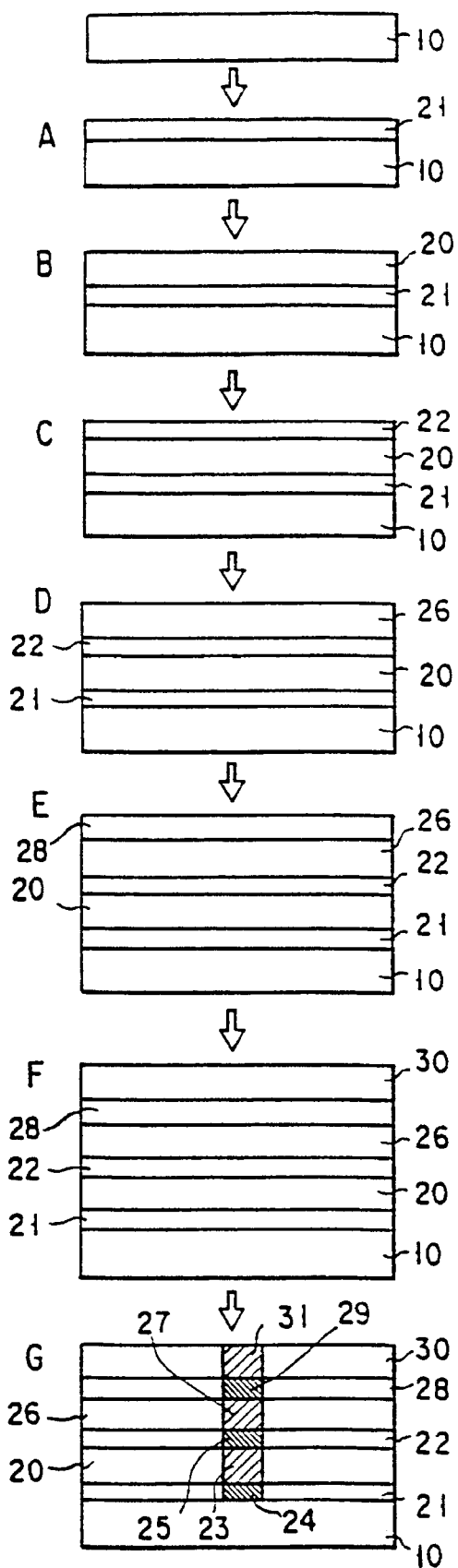
FIG. 25 is a view showing the steps of manufacturing the polyimide optical waveguide shown in FIG. 24.

The step F shown in FIG. 25 is the step of forming the sixth polyimide layer 30 having a refractive index lower than that of the polyimide layer 28, on the fifth polyimide layer 28.

An electron beam is applied to the upper side of the sixth polyimide layer 30 and hence to the substrate 10, in step G shown in FIG. 25. As a result, the core 24 is formed in the polyimide layer 21, the cladding 23 is in the second polyimide layer 20, the core 25 is in the third polyimide layer 22, the cladding 27 is in the fourth polyimide layer 26, the core 29 is in the fifth polyimide layer 28, and the cladding 31 is in the sixth polyimide layer 30, over the region irradiated with the electron beam.

Next, another embodiment of a polyimide optical waveguide having a six-layer structure will be described with reference to the sectional view of FIG. 26.

Figure 27:
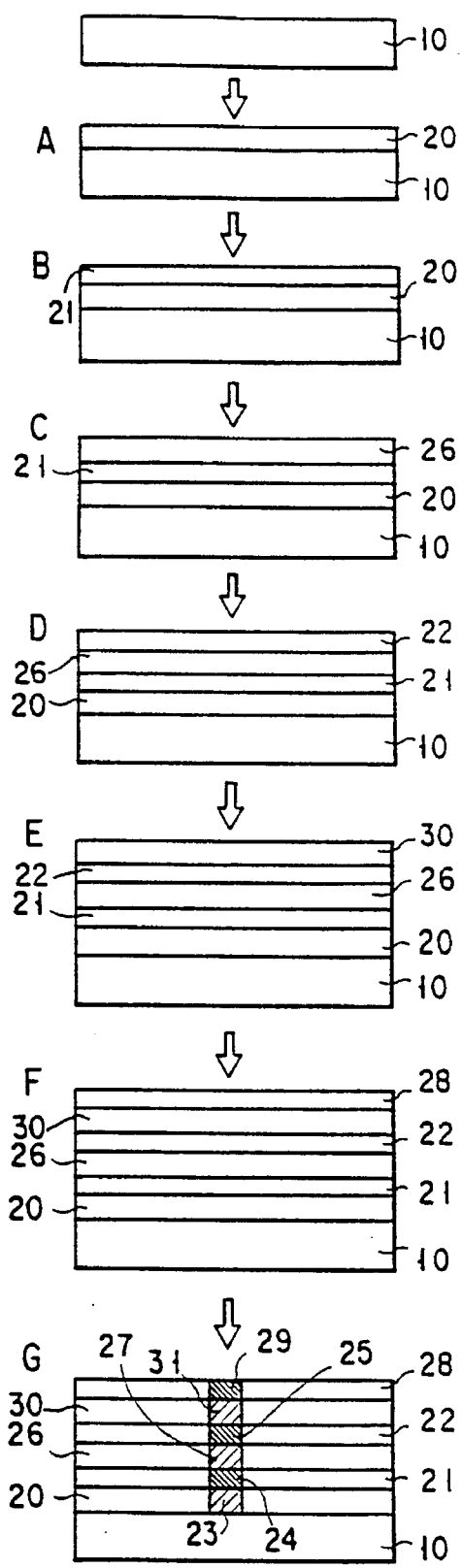
FIG. 27 is a view showing the steps of manufacturing the polyimide optical waveguide shown in FIG. 26.

The first to fifth layers of this embodiment are formed in steps A to E shown in FIG. 27 in the same way as the fist to fifth layers of the polyimide optical waveguide (FIG. 22) having a five-layer structure are formed in steps A to E shown in FIG. 23.

The step F shown in FIG. 27 shows the step of forming the sixth polyimide layer 28 having a refractive index higher than that of the polyimide layer 30, on the fifth polyimide layer 30.

An electron beam is applied to the upper side of the sixth polyimide layer 28 and hence to the substrate 10 in step G shown in FIG. 27. As a result, the cladding 23 is formed in the polyimide layer 20, the core 24 is in the second polyimide layer 21, the cladding 27 is in the third polyimide layer 26, the core 25 is in the fourth polyimide layer 22, the cladding 31 is in the fifth polyimide layer 30, and the core 29 is in the sixth polyimide layer 28, over the region irradiated with the electron beam.

FIG. 28 is a sectional view of the subject portion of a polyimide optical waveguide having a seven-layer structure, wherein a seventh polyimide layer 32 is formed on the sixth layer 28 of the waveguide of FIG. 26. The seventh layer 28 has a refractive index lower than that of the sixth layer 28. The cladding 23 is formed in the polyimide layer 20 by irradiating the upper side of the seventh polyimide layer 32 with an electron beam. The core 24 is formed in the polyimide layer 21, the cladding 27 is in the polyimide layer 26, the core 25 is in the polyimide layer 22, the cladding 31 is in the fifth polyimide layer 30, the core 29 is in the sixth polyimide layer 28, and the cladding 33 is in the seventh polyimide layer 32.

The step of manufacturing the cores and claddings of the waveguide shown in FIG. 28 will be described with reference to FIG. 29.

The first to sixth layers of this embodiment are formed in steps A to F shown in FIG. 27 in the same way as the first to sixth layers of the polyimide optical waveguide (FIG. 26) having a six-layer structure.

The step G shown in FIG. 29 shows the step of forming the seventh polyimide layer 32 having a refractive index lower than that of the sixth layer, on the sixth polyimide layer 28.

An electron beam is applied to the upper side of the seventh polyimide layer 32 and hence to the substrate 10, in step H shown in FIG. 29. As a result, the cladding 23 is formed in the polyimide layer 20, the core 24 is in the second polyimide layer 21, the cladding 27 is in the third polyimide layer 26, the core 25 is in the fourth polyimide layer 22, the cladding 31 is in the fifth polyimide layer 30, the core 29 is in the sixth polyimide layer 28, and the cladding 33 is in the seventh polyamide layer 32.

As mentioned above, the present invention provides a improved polyimide optical waveguide having two or more polyimide layers, and also a method of manufacturing the waveguide in which any core and any cladding are formed alternately in a predetermined region of each layer.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing a polyimide optical waveguide, comprising the steps of:

forming a core made of a polyimide whose refractive index is controlled to be a predetermined value by electron beam irradiation; and forming a cladding set in contact with said core, and said cladding being made of the same material as said core and having a refractive index lower than that of said core.

2. A method of manufacturing a polyimide optical waveguide according to claim 1, wherein said polyimide is a fluorinated polyimide.

3. A method of manufacturing a polyimide optical waveguide, comprising the steps of:

forming a first polyimide layer on a substrate;

forming a core layer having a predetermined refractive index by irradiating said polyimide layer with an electron beam;

forming a second polyimide layer on said core layer and removing said substrate, thereby forming a polyimide film having a two-layer structure; and bonding said second polyimide layer as a lower cladding to another substrate, thereby forming a core having a predetermined shape in said core layer.

4. The method according to claim 3, wherein said polyimide is fluorinated polyimide.

5. The method according to claim 3, wherein said step of forming said core layer comprises performing an RIE method on said core layer.

6. The method according to claim 3, wherein said step of bonding said second layer to the other substrate includes a (subsequent) step of spin-coating a polyamic acid solution on said second polyimide layer containing said, thereby forming an upper cladding by heat curing said polyamic acid.

7. A method of manufacturing a polyimide optical waveguide, comprising the steps of:

forming a first polyimide layer on a substrate;

forming a second polyimide layer on said first polyimide layer, said second polyimide layer having a refractive index higher than that of said first polyimide layer;

forming a third polyimide layer on said second polyimide layer, said third polyimide layer having a refractive index lower than that of said second polyimide layer; and performing electron beam lithography on said three polyimide layers, thereby forming a core in said second polyimide layer, said core having a predetermined refractive index and a predetermined shape.

8. The method according to claim 7, wherein said first, second and third polyimide films are made of fluorinated polyimide.

9. A method of manufacturing a polyimide optical waveguide, comprising the steps of:

forming a plurality of polyimide layers, one on another; and irradiating said plurality of polyimide layers with an electron beam, thereby forming cores and claddings alternately laid one on another, each cladding having a refractive index lower than those of said cores.

10. The method according to claim 9, wherein said step of forming a plurality of polyimide layers comprises forming two polyimide layers, one on the other, said two polyimide layers having different refractive indices.

11. The method according to claim 9, wherein said step of forming a plurality of polyimide layers comprises forming seven polyimide layers, one on another, said seven polyimide layers having different refractive indices.

12. A method of manufacturing a polyimide optical waveguide, comprising the steps of:

forming a first polyimide layer on a substrate; and forming a core having a predetermined refractive index and a predetermined size in an upper surface of said polyimide layer and to a predetermined depth, by irradiating said polyimide layer with an electron beam in the condition that the election beam is prevented from reaching a lower surface of said polyimide layer.

13. The method according to claim 12, further comprising a step of forming an upper cladding on said polyimide layer and also on said core.

14. The method according to claim 12, wherein said polyimide layer is made of fluorinated polyimide.

* * * * *